ELECTRONIC MULTIPLIER
Filed Jan. 26, 1951 4 Sheets-Sheet 1
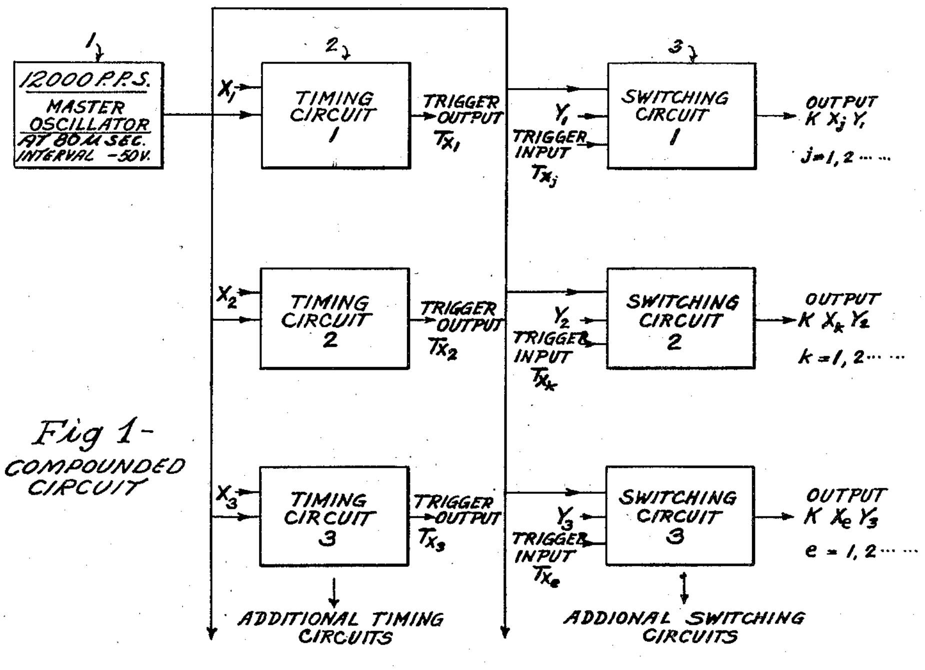
Fig 1-
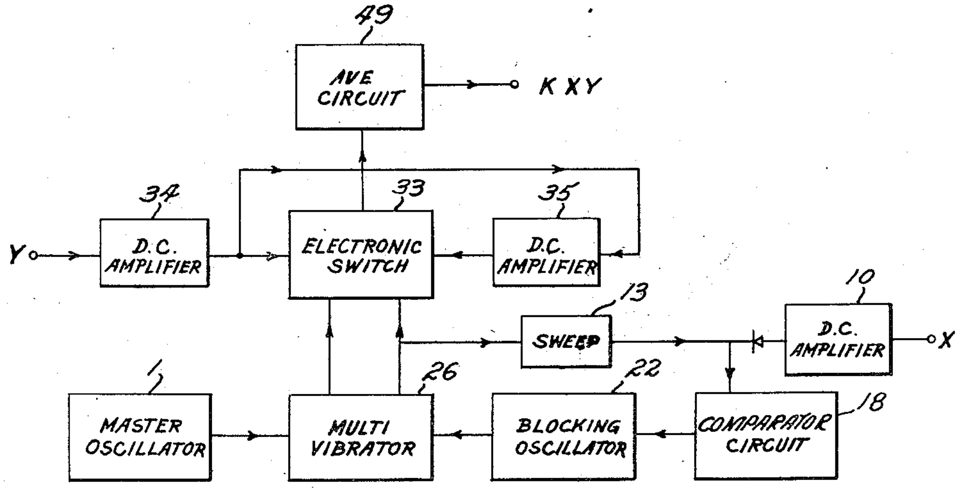
Fig. 4 - SINGLE MULTIPLIER CIRCUIT WITH ONE MULTI-VIBRATOR
INVENTOR.
Richard V. Baum
BY
ATTORNEY

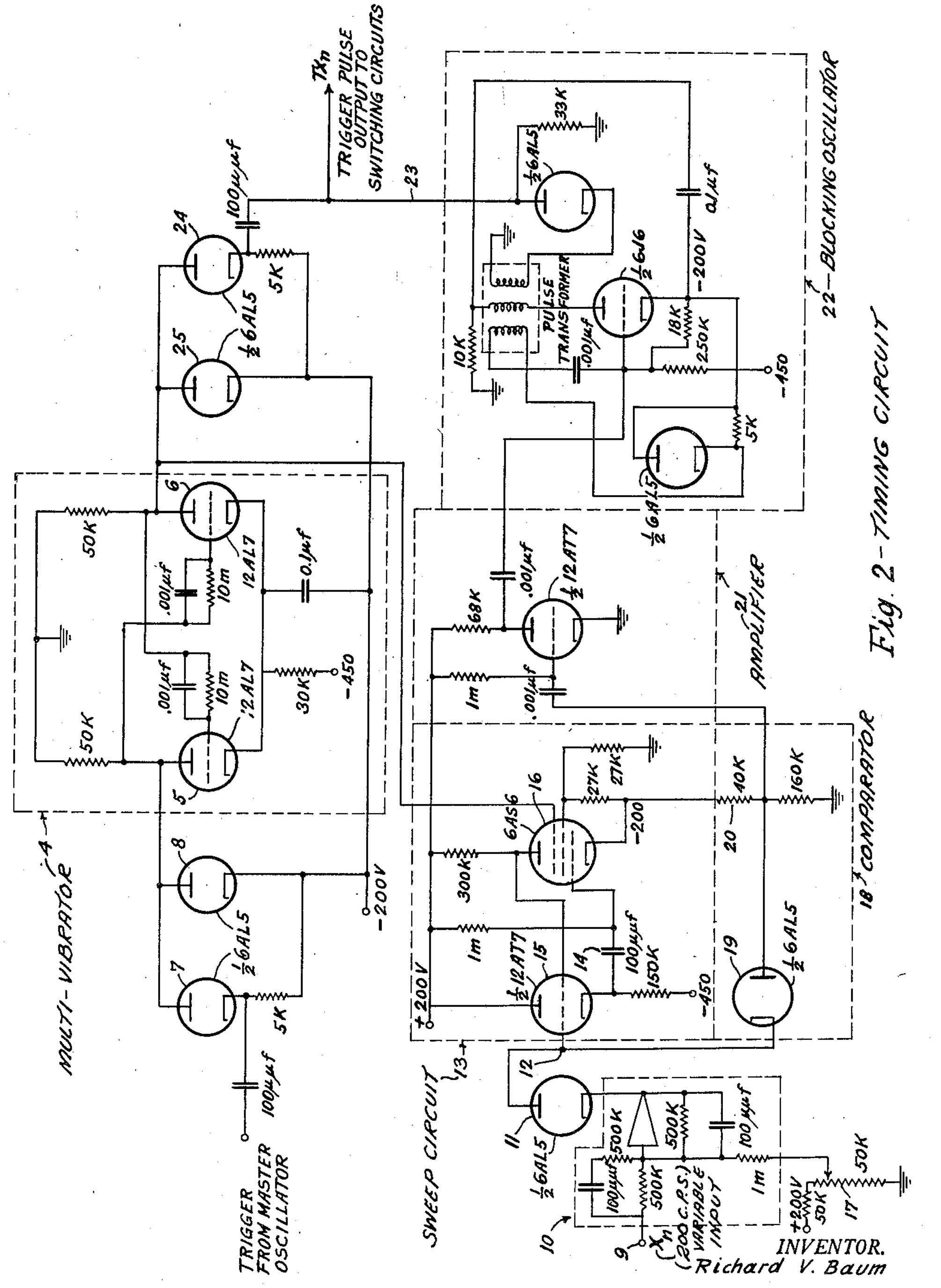
Fig. 2 - TIMING CIRCUIT
INVENTOR.
Richard V. Baum
BY
ATTORNEY

Dec. 11, 1956 R. V. BAUM 2,773,641
ELECTRONIC MULTIPLIER
Filed Jan. 26, 1951 4 Sheets-Sheet 3
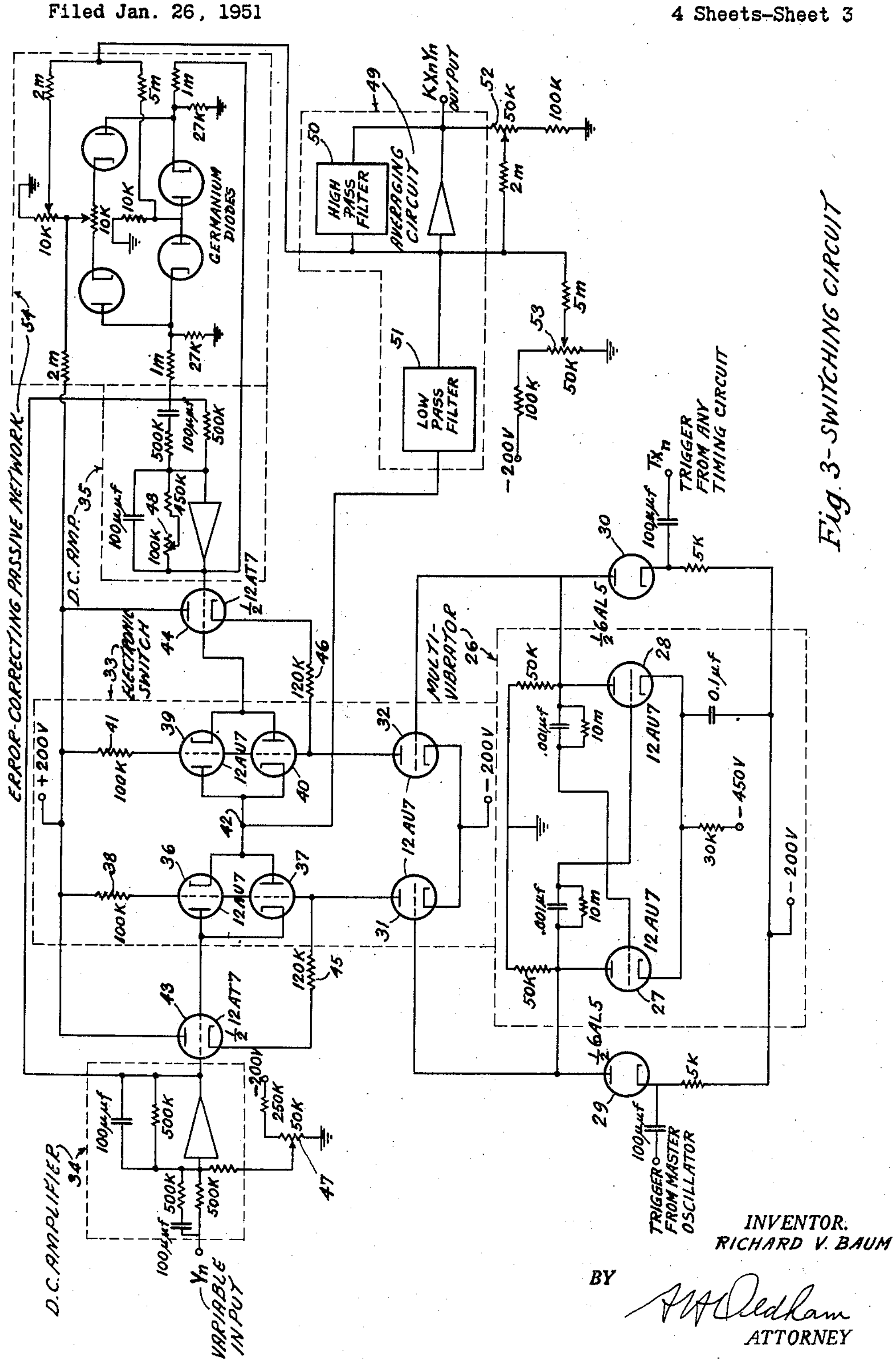
Fig. 3-SWITCHING CIRCUIT
INVENTOR.
RICHARD V. BAUM
BY [signature]
ATTORNEY THEORETICAL WAVE — Fig. 5
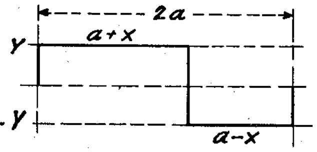
APPROXIMATE WAVE FORMS
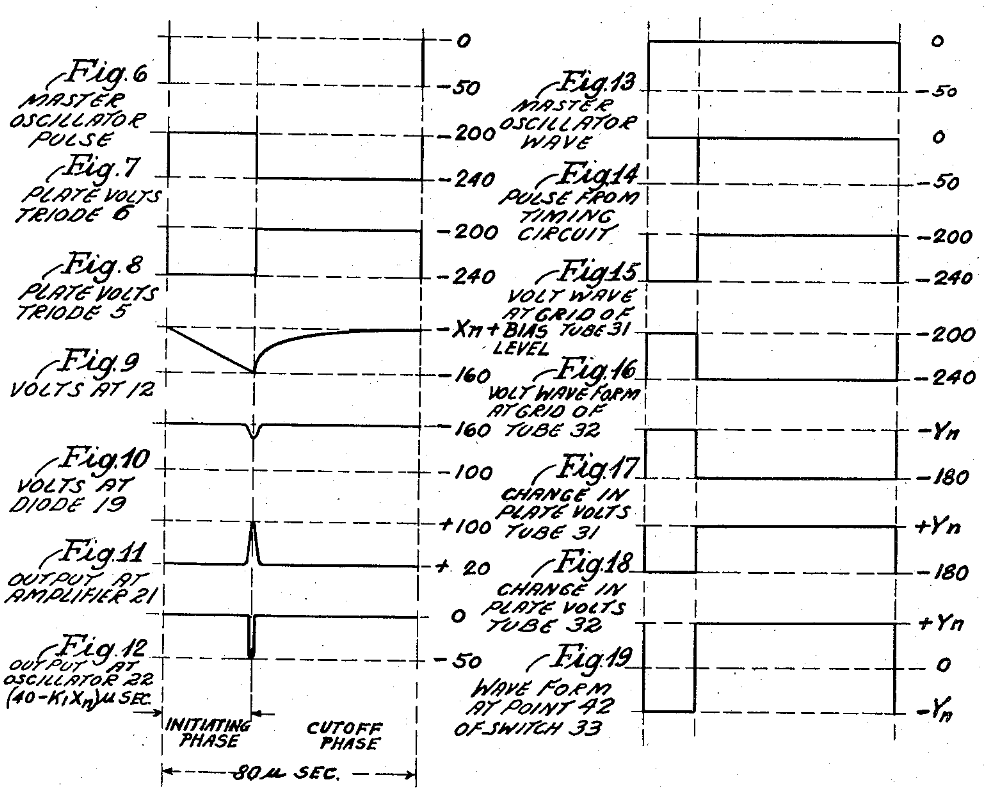
Fig. 6, Fig. 7, Fig. 8, Fig. 9, Fig. 10, Fig. 11, Fig. 12, Fig. 13, Fig. 14, Fig. 15, Fig. 16, Fig. 17, Fig. 18, Fig. 19
INVENTOR.
Richard V. Baum
BY A. H. Oldham
ATTORNEY 2,773,641

ELECTRONIC MULTIPLIER

Richard V. Baum, Akron, Ohio, assignor to Goodyear Aircraft Corporation, Akron, Ohio, a corporation of Delaware Application January 26, 1951, Serial No. 207,986

12 Claims. (Cl. 235—61)

This invention relates to an electronic computing system, and, more particularly, to an electronic circuit which produces an output voltage having an amplitude instantaneously proportional to the algebraic products of two variable input voltages.

A number of multipliers, both mechanical and electrical, have heretofore been proposed and are used in the analog computing art. Usually the multiplication of two variables is accomplished by servo-operated equipment. However, this type of multiplier is open to the objection that it is too slow to be useful for certain computations. Electronic multipliers have been developed which have the requisite speed, but usually are subject to one or more of the following defects:

1. They are unable to accommodate both positive and negative inputs to produce an output of the proper algebraic signs.
2. They require matched or selected tubes in order to give reasonable accuracy.
3. They have excessive error due to drift and to undesired tube non-linearities.
4. They have a lower limit on frequency response due to capacitive coupling between elements.

It is the general object of this invention to avoid and overcome the foregoing and other difficulties of and objections to prior art practice by the provision of an electronic multiplier that is more accurate, less expensive to build and maintain, and less complicated in its construction.

Another object of this invention is to provide an electronic multiplier which produces an output voltage whose amplitude is instantaneously proportional to the algebraic product of two variable input voltages.

Another object of this invention is the provision of an electronic multiplier which accommodates both positive and negative input voltages and produces an output voltage of the proper algebraic sign.

Another object of this invention is the provision of a multiplier which is wholly electronic in its operation, thus obviating the use of precision potentiometers or extensive non-backlash gearing necessary in servo-motor operated equipment.

Another object of this invention is to provide an electronic multiplier which does not require matched or selected tubes.

Another object of this invention is to provide an electronic multiplier which is relatively free of error due to drift and undesired tube non-linearities.

These and other objects of the invention which will become apparent as the description proceeds are achieved by the provision of an electronic multiplier for producing an output voltage signal proportional to the product of two variable voltage input signals comprising a negative feedback D. C. amplifier receiving one of the input signals, the output signal of the amplifier being of opposite polarity from the input, a second negative feedback D. C. amplifier in series with the first, the output of the second amplifier being the same polarity as the said input signal, an averaging circuit, the output voltage of which is the product of the two input signals, an electronic switching means for alternately coupling the output signal from each of said amplifiers to the averaging circuit, timing means associated with the switch for reversing the switch at intervals of time which are a function of the other of said variable input voltage signals, said timing means including a pulse generator producing sharply peaked negative pulses at equal time intervals, a bistable multivibrator, said multivibrator being coupled to the pulse generator whereby the pulse generator triggers the multivibrator to one of the two stable phases thereof, hereinafter called the initiating phase, a sweep circuit adapted to generate a linearly increasing negative voltage at a predetermined fixed rate, said sweep circuit being coupled to the multivibrator and adapted to generate a sweep voltage only during the initiating phase of the multivibrator, a third negative feedback D. C. amplifier receiving said other variable voltage input signal, diode means for coupling the output of the third amplifier to the sweep circuit for limiting the initial amplitude of the sweep voltage to a value proportional to the output voltage of the third amplifier, a blocking oscillator having its output coupled to the multivibrator, a diode comparator coupling the output of the sweep circuit with the blocking oscillator, the comparator producing an output voltage signal when the sweep voltage exceeds a predetermined amplitude for triggering the blocking oscillator and thereby switching the multivibrator to the second stable phase thereof, hereinafter called the cutoff phase, said multivibrator being coupled to the electronic switch whereby the initiating phase and cutoff phase thereof alternately bias the switch to connect respectively the second and first amplifiers to the input of the averaging circuit.

For a better understanding of the invention, reference should be had to the accompanying drawings, wherein:

Fig. 1 is a block diagram showing how units of the multiplier can be added and compounded to obtain multiples proportional to any number of variable input signals;

Fig. 2 is a schematic wiring diagram of the timing circuit;

Fig. 3 is a schematic wiring diagram of the switching circuit;

Fig. 4 is a block diagram of a single combined multiplier unit;

Fig. 5 is a diagram of the theoretical wave form showing the mathematical relationship between the various parts of the wave to the signal voltages whose product is desired; and Figures 6 to 19 are diagrams of the waveform at various points in the multiplier circuit.

It is believed that the invention can best be understood by reference to Fig. 5 showing diagrammatically one complete cycle of a rectangular wave having a period equal to $2a$, where $a$ is a constant. If the absolute amplitude of the wave is equal to $y$ and the phase of the wave is reversed at an internal of $a+x$, where $x$ never exceeds the value of $a$, the average amplitude of the wave over one complete cycle is shown by the following equation:

$$\frac{y(a+x)-y(a-x)}{2a}=\frac{xy}{a} \qquad (1)$$

Thus, if two variable signals proportional to $x$ and $y$ can be translated into a voltage wave of the above form, averaging the voltage wave over one cycle will give a signal proportional to the instantaneous product of the two variables. The invention utilizes this principle, the multiplier consisting of circuits capable of generating and obtaining the average of the wave form shown in Fig. 5.

With specific reference to the form of the invention illustrated in the drawings, the numeral 1 indicates generally a master oscillator designed to generate sharply peaked negative pulses. The specific form of the master oscillator forms no part of this invention and can be of any one of a number of known oscillator circuits capable of producing sharply peaked pulses at the rate of approximately 12,000 pulses per second. Best results were obtained by the inventor where the pulses were spaced at intervals of approximately 80 microseconds with the amplitude of the pulses being approximately −50 volts. However, these figures are given by way of example only, and may be varied to suit any particular operation.

The output of the master oscillator is simultaneously applied to the timing circuit, indicated generally at 2, and the switching circuit, indicated generally at 3, in a manner hereinafter described.

The timing circuit 2 (see Fig. 2) includes a multivibrator 4 of conventional design including a pair of triodes 5 and 6. The multivibrator has a natural frequency of a few cycles per second. However, in normal operation of the timing circuit, the multivibrator is triggered at a rate much higher than its normal oscillating frequency, and thus operates as though it were actually a bistable multivibrator. It is necessary that the multivibrator be capable of oscillating at a low frequency to insure that the timing circuit will be self-starting.

The multivibrator is triggered alternately by the pulses from the master oscillator 1 by means of a diode pulse inserting tube 7. A diode 8 is used to limit the maximum positive plate voltage of triode 5. By limiting the voltage swing of the multivibrator, the phase reversal time is held to a minimum, and error introduced by this rise time is virtually eliminated. The negative pulses from the master oscillator cut off triode 6 so that the plate voltage at triode 6 rises sharply, as indicated in Fig. 7. It will be seen that the rise of voltage occurs simultaneously with the master oscillator pulse. (Fig. 6 shows the voltage pulses applied to the diode 7 from the master oscillator.) Also, the plate voltage of triode 5 simultaneously drops, as shown in Fig. 8. The phase of the multivibrator triggered by the master oscillator is defined and hereinafter referred to as the initiating phase.

The multivibrator 4 is reversed in phase from that triggered by the oscillator pulses in the following manner: A variable voltage input signal $x$ is applied to the input terminal 9 of a negative feedback D. C. amplifier 10. The input and feedback networks of the amplifier 10 are designed to give the amplifier a low output impedance and to have negligible phase shift at the useful frequencies of the variable voltage $x$, which is generally of the order of 200 cycles per second or less.

The output of the D. C. amplifier 10 is connected to the cathode of a diode 11, which couples the amplifier 10 to the output 12 of a sweep circuit 13. The sweep circuit 13 is a type known in the art as a Miller integrator. The sweep circuit 13 includes a condenser 14, the controlled discharge of which generates the sweep voltage. The sweep circuit also includes a cathode follower tube 15 which charges the condenser 14 when the pentode 16 is cut off. The suppressor grid of the pentode 16 is coupled to the plate of the triode 6 of the multivibrator. The potential of the suppressor grid goes up during the initiating phase of the multivibrator, thereby initiating the plate current of the pentode 16, dropping the plate voltage thereof and initiating the sweep. The plate voltage, in a manner characteristic of the Miller integrator, continues to decrease at a fixed rate over the useful range as determined by the RC constant of the pentode control grid circuit.

The potential of the output 12 of the Miller integrator at the start of the sweep is determined by the input voltage $x$, the plate of the diode 11 holding the potential at the output 12 at substantially the output potential of the D. C. amplifier 10. The condenser 14 is initially charged by the cathode follower 15 to substantially this same potential. The initial voltage range at the output 12 thus is determined by the voltage range of the variable input signal $x$. A potentiometer 17 is used to adjust the average voltage level at the output 12 to any desired value.

The master oscillator 1 having triggered the multivibrator 4 and started the Miller integrator sweep cycle, the potential at the output 12 drops at a fixed rate from the initial potential determined by input signal $x$ and potentiometer 17. (Fig. 9 illustrates the voltage waveform at the output 12.) The output 12 of the Miller integrator 13 is connected to a comparator circuit 18, including a diode 19 having its plate connected to a voltage divider 20. The plate is nominally held by the voltage divider at a potential of −160 volts. As the potential at 12 continues to drop, the cathode of the diode 19 reaches the potential of the plate and the diode starts to conduct, reducing the plate voltage below −160 volts. (Fig. 10 shows the plate voltage change of diode 19.)

The plate of the diode 19 is coupled to an amplifier 21, which amplifies the diode plate voltage swing. The amplified signal from the amplifier 21 in turn is applied to a blocking oscillator 22. The blocking oscillator 22 is a conventional and well known circuit and is designed to produce a sharp negative pulse at the output 23 when triggered by the output signal from the amplifier 21. (See Figures 11 and 12 for the waveform of the output of the amplifier and blocking oscillator respectively.)

The purpose of the amplifier 21 and blocking oscillator 22 is to produce a sharply peaked negative pulse at the instant the sweep voltage exceeds a predetermined level as detected by the comparator circuit 18. The output pulse of the blocking oscillator is applied to the cathode of a pulse inserting diode 24. Diodes 7 and 24 isolate the plate circuits of the multivibrator so that the low output impedance of the master and blocking oscillators does not affect the time required for the multivibrator to reverse phase. The pulse is applied to the plate of the triode 6 to trigger the multivibrator and reverse the phase thereof, the plate of the triode 6 dropping to a lower potential and the plate of the triode 5 rising to the potential fixed by the diode 8. A diode 25 limits the plate voltage swing of the triode 6 and functions in the same manner as the diode 8.

When the multivibrator 4 is triggered to the reverse phase, defined as the cutoff phase, by the blocking oscillator pulse, the resulting drop in potential of the suppressor grid of the pentode 16 cuts off the sweep. During the ensuing interval, before the next pulse is received from the master oscillator 1, the condenser 14 is recharged by the cathode follower 15 and the Miller integrator is then ready to commence another cycle of operation.

The potentiometer 17 is adjusted so that when the input signal $x$ is zero, the blocking oscillator pulse occurs midway between successive master oscillator pulses, so that alternate portions of the timing waveform are of equal duration. The RC constant of the pentode control grid circuit is adjusted so that, with the maximum amplitude of $x$, the sweep terminates a sufficient time before the output of the next oscillator pulse to allow the cathode follower to fully charge the condenser 14.

From the above description, it will be apparent that the timing circuit 2 produces a negative delayed pulse an interval of time after the master oscillator pulse that is proportional to the difference in potential between a constant voltage, as determined by the voltage divider 20, and a variable voltage, as determined by the input signal $x$.

The timing circuit thus provides a time delay means in which the time delay interval between the input pulse and the output pulse is equal to half the time interval between successive input pulses minus a time interval proportional to the input signal $x$, where the proportionality factor is such that for the normal range of the input signal, the delay pulse falls between successive input pulses. Thus a time base conforming to that of the desired theoretical waveform of Fig. 5 is achieved.

The amplitude of the desired wave form is derived from a second variable voltage input signal $y$ by means of the switching circuit 3 (see Fig. 3) as hereinafter described.

The switching circuit 3 includes a multivibrator 26 which is preferably identical in operation to the multivibrator 4 in the timing circuit 2, and includes a pair of triodes 27 and 28. The multivibrator 26 is triggered alternately by pulses from the master oscillator 1 and the blocking oscillator 22 by means of diode pulse inserting tubes 29 and 30, which function in the same manner as the inserting diodes 7 and 24. (The pulsing signal received at the cathode of the tubes 29 and 30 is shown in Figs. 13 and 14 respectively.) The plates of the triodes 27 and 28 of the multivibrator 26 are connected directly to the grids of the switch biasing triodes 31 and 32 respectively.

The multivibrator 26 functions to bias an electronic switch, indicated at 33. The electronic switch is in effect a single-pole double-throw switch which alternately connects two input signals to an output circuit. The switch is "thrown" one way or the other by the change in phase of the multivibrator 26.

The input signals to the switch 33 are derived from the output of a pair of negative feedback D. C. amplifiers 34 and 35 connected in series. These amplifiers are similar in design and operation to the above-described amplifier 10. A variable input signal $y$ is applied to the input of the amplifier 34. Since the gain of the amplifier is unity, the output of the amplifier 34, applied simultaneously to one side of the switch 33 and to the input of the amplifier 35, is equal in amplitude to the variable input signal, although opposite in polarity. The output of the amplifier 35 is applied to the other side of the switch 33 and is of the same polarity and amplitude as the variable input signal $y$.

The electronic switch 33 includes a pair of triodes 36 and 37 connected in inverse parallel relation. The grids of the triodes 36 and 37 are connected in series and to a positive D. C. voltage source, as shown, through a series resistor 38. A second pair of triodes 39 and 40 are similarly connected in inverse parallel relation with their grids connected in series through a resistor 41 to the same D. C. supply. The cathodes of triodes 36 and 40 and the plates of triodes 37 and 39 are connected to a common output pole 42. The output of the D. C. amplifier 34 is connected to the plate of triode 36 and the cathode of triode 37. The output of the D. C. amplifier 35 is similarly connected to the triodes 39 and 40.

The grids of triodes 36 and 37 are connected to the plate of the triode 31. Similarly, the grids of triodes 39 and 40 are connected to the plate of triode 32. The cathodes of triodes 31 and 32 are connected to a negative D. C. voltage source as shown. The grid of triode 31 is connected to the plate of the triode 27 of the multivibrator 26, while the grid of the triode 32 is connected to the plate of the triode 28 of the multivibrator 26. It will be appreciated that the triodes 31 and 32 serve to limit the plate voltage of the two triodes 27 and 28 of the multivibrator 26 to a potential no higher than the voltage on the cathodes of the triodes 31 and 32, thereby limiting the voltage swing of the multivibrators in the same manner and for the same reason as above described in connection with the diodes 8 and 25. (See Figures 15 and 16 for the voltage waveform at the grids of triodes 31 and 32 respectively.)

It will also be evident that as the multivibrator 26 is triggered successively from one phase to the other, the triodes 31 and 32 are alternately rendered conductive. During the conductive period of either triode, the respective plate drops to a potential considerably negative with respect to the input voltage signal $-y$. (Figures 17 and 18 show the change in plate voltage on triodes 31 and 32 respectively.) The plate of the triode which is cut off, on the other hand, rises to a potential determined by the associated tubes of the switch 33. Thus, assuming that the triode 31 is conducting, the plate voltage is at a potential of approximately −180 volts, depending on the value of the resistor 38. The potential on the cathode of the triode 37 is determined by the input signal $y$, the voltage range of which is such that the cathode will never be more negative than the grid of triode 37 when triode 31 is conducting. Thus the tube 37 is cut off. The plate voltage of the triode 32 seeks a potential determined by the grid of triode 39. It is evident that this potential is approximately equal to the input signal $y$ by virtue of grid current through resistor 41. With the grids of triodes 39 and 40 at the same potential as the input signal $y$, in the absence of any appreciable loading, the pole 42 maintains the same potential. The cathode of triode 36 is therefore considerably positive with respect to the grid, preventing conduction of that tube. On reversal of phase of the multivibrator 26, triode 32 becomes conductive, cutting off tubes 39 and 40. The potential at output pole 42 drops to $-y$, as determined by tubes 36 and 37.

A pair of tubes 43 and 44 are associated with the plate circuit of the triodes 31 and 32, the cathodes of the tubes 43 and 44 being connected through resistors 45 and 46 respectively. In operation, tubes 43 and 44 control the rise rate of the plate voltage of triodes 31 and 32 respectively, after conduction is cut off through either of the triodes. Thus assuming triode 31 is conducting, a voltage is developed across resistor 45 which is a function of the input potential on the control grid of tube 43. The rate of rise of the plate of triode 31 increases in proportion to the voltage across resistor 45 and therefore is likewise a function of the input potential to the switch 33. The tubes 43 and 44 materially improve the operation of the switch 33, resulting in an improved wave form of the voltage signal at 42.

From the above description, it will be evident that the multivibrator 26 and electronic switch 33 combine to provide in effect a squarewave generator, the squarewave, as measured at output pole 42, being substantially that of the theoretical waveform of Fig. 5. The amplitude is determined by input signal $y$, and the cycle is divided in time as function of $x$. The polarity of the actual wave, as shown in Fig. 19, is reversed in polarity from that of the theoretical waveform. However, this reversal is corrected by the inverting effect of the averaging circuit to be hereinafter described.

A potentiometer 47 on the input of the amplifier 34 provides a small negative bias voltage to the input signal $y$ and is adjusted so that the output of the multiplier is not a function of $x$ when $y$ is equal to zero. This adjustment corrects for small differences in the D. C. level between the two sections of the switch 33, and for any unbalance of the amplifiers 34 and 35. A variable resistor 48 is provided in the feedback network of the D. C. amplifier 35 for adjusting the gain thereof, and is set so that the output of the multiplier is not a function of $y$ when $x$ is equal to zero. In other words, even though the blocking oscillator pulse does not occur exactly halfway between successive master oscillator pulses when the input signal $x$ is zero, by adjusting the relative amplitude of the output of the two amplifiers, the average amplitude over one cycle is still proportional to the product of $x$ and $y$.

The output signal at the pole 42 of the switch 33, as indicated in Fig. 19, is applied to an averaging circuit 49, the output of which is proportional to the average amplitude of the input signal over a short interval of time. The output voltage of the averaging circuit 49 at any instant is proportional to the average of all preceding cycles, with the contribution of each cycle dropping off exponentially as its remoteness in time. Thus, actually never more than four or five preceding cycles of the voltage wave at 42 appreciably affect the instantaneous output voltage of the averaging circuit 49.

The averaging circuit 49 comprises a negative feedback D. C. amplifier in which the feedback network is a high-pass filter and the input network is a low-pass filter. A potentiometer 52 is provided in the feedback network of the amplifier to adjust the gain to give the desired scale factor of the output signal. A potentiometer 53 is provided to add a small negative voltage to the input of the amplifier and is adjusted so that the output level of the averaging circuit 49 is zero when input signals $x$ and $y$ are zero. The averaging circuit is effectively a low-pass filter designed to pass all frequencies over a range below the repetition rate determined by the master oscillator, without appreciable phase shift, and to sharply attenuate at the repetition frequency and above.

In addition, an error-correcting passive network 54, having input voltages derived from the voltage signals $y$ and $-y$, adds an error function which is the negative of that produced by the switch 33, and introduces it into the averaging circuit 50. This error, which is canceled by the error-correcting network, is normally of the magnitude of approximately $\pm 1/10\%$ of full scale and is the residual error, due to the finite rise time, that is not removed by the action of the triodes 43 and 44.

As shown in Fig. 1, any number of timing circuits 2 can be used with any number of switching circuits 3, all triggered from a single master oscillator 1. By pairing any one of a plurality of timing circuits with any one of the plurality of switching circuits, an output can be obtained which is proportional to the product of the input signals applied to those particular timing and switching circuits. Also, it should be noted that a timing circuit and switching circuit may be combined into a complete multiplier employing a single multivibrator. This is accomplished by connecting the plate of the diode 30 directly to the suppressor grid of the cathode 16 of the Miller integrator circuit, thus completely eliminating the need for the multivibrator associated with the timing circuit of Fig. 2. A block diagram of such a unit is illustrated in Fig. 4 and with like numbers being used therein to designate like parts. The timing pulses from such a single multiplier unit can still be used to trigger additional switching circuits whereby the product of one signal with any one of a number of other input voltage signals can be obtained.

From the above description, it will be evident that the objects of the invention have been obtained by providing an electronic multiplier circuit capable of generating an output signal continuously proportional to the product of two or more variable input signals, regardless of their algebraic sign. The multiplier operates effectively on input signals from D. C. up to frequencies of 200 cycles per second without objectionable phase lag in the output. The circuits can be readily arranged to get the products of any number of pairs of input signals. Errors due to drift and tube non-linearities are eliminated, and other error factors are compensated. The multiplier is fast, accurate, stable, trouble-free, fully electronic, and requires no precision potentiometers, expensive gearing, and the like, found in other known comparable multipliers.

While certain representative embodiments and details have been shown for the purpose of illustrating the invention, it will be apparent to those skilled in this art that various changes and modifications may be made therein without departing from the spirit or scope of the invention.

I claim:

1. An electronic multiplier for producing an output voltage signal proportional to the product of two variable voltage input signals comprising a negative feedback D. C. amplifier receiving one of the input signals, the output signal of the amplifier being of opposite polarity from the input; a second negative feedback D. C. amplifier in series with the first, the output of the second amplifier being the same polarity as the said input signal, averaging circuit means the output voltage of which is proportional to the product of the two input voltage signals, an electronic switch for alternately coupling said amplifiers to the averaging circuit means, timing means connected to the switch for reversing the switch at intervals of time which are a function of the other of said variable input voltage signals, said timing means including a pulse generator producing sharply peaked negative pulses at equal time intervals, a bistable multivibrator, said multivibrator being coupled to the pulse generator whereby the pulse generator triggers the multivibrator to one of the two stable phases thereof, said one stable phase being defined as the initiating phase, a sweep circuit adapted to generate a linearly increasing negative voltage at a predetermined fixed rate, said sweep circuit being coupled to the multivibrator to generate a sweep voltage only during the initiating phase of the multivibrator, a third negative feedback D. C. amplifier receiving said other variable input voltage signal, diode means for coupling the output of the third negative feedback D. C. amplifier to the sweep circuit for limiting the initial amplitude of the sweep voltage to a value proportional to the output voltage of said third amplifier, a blocking oscillator having its output coupled to the multivibrator, diode comparator means coupling the output of the sweep circuit with the blocking oscillator, said diode comparator means producing an output voltage signal when the sweep voltage exceeds a predetermined amplitude for triggering the blocking oscillator and thereby switching the multivibrator to the second stable phase thereof, defined as the cutoff phase, said multivibrator being coupled to the electronic switch whereby the initiating phase and cutoff phase thereof alternately bias the electronic switch to connect respectively the second and first amplifiers to the input of the averaging circuit means.

2. An electronic multiplier for producing an output signal proportional to the product of two variable input signals comprising an amplifier receiving one of the input signals, the output signal of the amplifier being of opposite polarity from the input, a second amplifier in series with the first, the output of the second amplifier being the same polarity as the said input signal, averaging circuit means the output of which is proportional to the product of the two input signals, an electronic switch for alternately coupling said amplifiers to the averaging circuit means, timing means connected to the switch for reversing the switch at intervals of time which are a function of the other of said variable input signals, said timing means including a pulse generator producing sharply peaked negative pulses at equal time intervals, a bistable multivibrator, said multivibrator being coupled to the pulse generator whereby the pulse generator triggers the multivibrator to one of the two stable phases thereof, said one stable phase being defined as the initiating phase, a sweep circuit adapted to generate a linearly increasing negative voltage at a predetermined fixed rate, said sweep circuit being coupled to the multivibrator to generate a sweep voltage only during the initiating phase of the multivibrator, a third amplifier receiving said other variable input signal, diode means for coupling the output of the third amplifier to the sweep circuit for limiting the initial amplitude of the sweep voltage to a value proportional to the output voltage of said third amplifier, a blocking oscillator having its output coupled to the multivibrator, a diode comparator coupling the output of the sweep circuit with the blocking oscillator, said comparator producing an output voltage signal when the sweep voltage exceeds a predetermined amplitude for triggering the blocking oscillator and thereby switching the multivibrator to the second stable phase thereof, defined as the cutoff phase, said multivibrator being coupled to the electronic switch whereby the initiating phase and cutoff phase thereof alternately bias the electronic switch to connect respectively the second and first amplifiers to the input of the averaging circuit means.

3. An electronic multiplier for producing an output signal proportional to the product of two variable input signals comprising an amplifier receiving one of the input signals, the output signal of the amplifier being of opposite polarity from the input, a second amplifier in series with the first, the output of the second amplifier being the same polarity as the said input signal, averaging circuit means the output of which is proportional to the product of the two input signals, an electronic switch for alternately coupling said amplifiers to the averaging circuit means, timing means connected to the switch for reversing the switch at intervals of time which are a function of the other of said variable input signals, said timing means including a pulse generator producing sharply peaked negative pulses at equal time intervals, a bistable multivibrator, said multivibrator being coupled to the pulse generator whereby the pulse generator triggers the multivibrator to one of the two stable phases thereof, said one stable phase being defined as the initiating phase, a sweep circuit generating a linearly increasing negative voltage at a predetermined fixed rate, said sweep circuit being coupled to the multivibrator to generate a sweep voltage only during the initiating phase of the multivibrator, means connected to the sweep circuit for limiting the initial amplitude of the sweep voltage to a value proportional to the inverse of said other variable input signal, a blocking oscillator having its output coupled to the multivibrator, diode comparator means coupling the output of the sweep circuit with the blocking oscillator, said diode comparator means producing an output voltage signal when the sweep voltage exceeds a predetermined amplitude for triggering the blocking oscillator and thereby switching the multivibrator to the second stable phase thereof, defined as the cutoff phase, said multivibrator being coupled to the electronic switch whereby the initiating phase and cutoff phase thereof alternately bias the electronic switch to connect respectively the second and first amplifiers to the input of the averaging circuit means.

4. An electronic multiplier for producing an output signal proportional to the product of two variable input signals comprising an amplifier receiving one of the input signals, the output signal of the amplifier being of opposite polarity from the input, a second amplifier in series with the first, the output of the second amplifier being the same polarity as the said input signal, averaging circuit means the output of which is proportional to the product of the two input signals, an electronic switch for alternately coupling said amplifiers to the averaging circuit means, timing means connected to the switch for reversing the switch at intervals of time which are a function of the other of said variable input signals, said timing means including a pulse generator producing sharply peaked negative pulses at equal time intervals, a bistable multivibrator, said multivibrator being coupled to the pulse generator whereby the pulse generator triggers the multivibrator to one of the two stable phases thereof, said one stable phase being defined as the initiating phase, a sweep circuit generating a linearly increasing negative voltage at a predetermined fixed rate, said sweep circuit being coupled to the multivibrator to generate a sweep voltage only during the initiating phase of the multivibrator, means connected with the sweep circuit for limiting the initial amplitude of the sweep voltage to a value proportional to the inverse of said other variable input signal, comparator means coupling the sweep circuit with the multivibrator for triggering the multivibrator when the sweep voltage exceeds a predetermined amplitude thereby switching the multivibrator to the second stable phase thereof, defined as the cutoff phase, said multivibrator being coupled to the electronic switch whereby the initiating phase and cutoff phase thereof alternately bias the electronic switch to connect respectively the second and first amplifiers to the input of the averaging circuit means.

5. An electronic multiplier for producing an output signal proportional to the product of two variable input signals comprising inverting means for reversing the polarity of one of the input signals, averaging circuit means the output of which is proportional to the product of the two input signals, an electronic switch for alternately passing one said input signal and the output of said inverting means to the averaging circuit means, timing means connected to the switch for reversing the switch at intervals of time which are a function of the other of said variable input signals, said timing means including a pulse generator producing sharply peaked negative pulses at equal time intervals, a bistable multivibrator, said multivibrator being coupled to the pulse generator whereby the pulse generator triggers the multivibrator to one of the two stable phases thereof, said one stable phase being defined as the initiating phase, a sweep circuit generating a linearly increasing negative voltage at a predetermined fixed rate, said sweep circuit being coupled to the multivibrator to generate a sweep voltage only during the initiating phase of the multivibrator, an amplifier receiving said other variable input signal, diode means for coupling the output of said amplifier to the sweep crcuit for limiting the initial amplitude of the sweep voltage to a value proportional to the output voltage of said amplifier, a blocking oscillator having its output coupled to the multivibrator, comparator means coupling the output of the sweep circuit with the blocking oscillator, said comparator means producing an output voltage signal when the sweep voltage exceeds a predetermined amplitude for triggering the blocking oscillator and thereby switching the multivibrator to the second stable phase thereof, defined as the cutoff phase, said multivibrator being coupled to the electronic switch whereby the initiating phase and cutoff phase thereof alternately bias the electronic switch to pass respectively said one input signal and the the output of said inverting means to the input of the averaging circuit means.

6. An electronic multiplier for producing an output signal proportional to the product of two variable input signals comprising inverting means for reversing the polarity of one of the input signals, averaging circuit means the output of which is proportional to the product of the two input signals, switching means for alternately passing one said input signal and the output of said inverting means to the averaging circuit means, timing means connected to the switch for reversing the switch at intervals of time which are a function of the other of said variable input signals, said timing means including a pulse generator producing sharply peaked negative pulses at equal time intervals, a bistable multivibrator, said multivibrator being coupled to the pulse generator whereby the pulse generator triggers the multivibrator to one of the two stable phases thereof, said one stable phase being defined as the initiating phase, a sweep circuit generating a linearly increasing negative voltage at a predetermined fixed rate, said sweep circuit being coupled to the multivibrator to generate a sweep voltage only during the initiating phase of the multivibrator, an amplifier receiving said other variable input signal, diode means for coupling the output of said amplifier to the sweep circuit for limiting the initial amplitude of the sweep voltage to a value proportional to the output voltage of said amplifier, a blocking oscillator having its output coupled to the multivibrator, comparator means coupling the output of the sweep circuit with the blocking oscillator, said comparator means producing an output voltage signal when the sweep voltage exceeds a predetermined amplitude for triggering the blocking oscillator and thereby switching the multivibrator to the second stable phase thereof, defined as the cutoff phase, said multivibrator being coupled to the electronic switch whereby the initiating phase and cutoff phase thereof alternately bias the electronic switch to pass respectively said one input signal and the output of said inverting means to the input of the averaging circuit means.

7. An electronic multiplier for producing an output signal proportional to the product of two variable input signals comprising inverting means for reversing the polarity of one of the input signals, averaging circuit means the output of which is proportional to the product of the two input signals, switching means for alternately passing one said input signal and the output of said inverting means to the averaging circuit means, timing means connected to the switch for reversing the switch at intervals of time which are a function of the other of said variable input signals, said timing means including a pulse generator producing sharply peaked negative pulses at equal time intervals, a bistable multivibrator, said multivibrator being coupled to the pulse generator whereby the pulse generator triggers the multivibrator to one of the two stable phases thereof, said one stable phase being defined as the initiating phase, a sweep circuit generating a linearly increasing negative voltage at a predetermined fixed rate, said sweep circuit being coupled to the multivibrator to generate a sweep voltage only during the initiating phase of the multivibrator, an amplifier receiving said other variable input signal, diode means for coupling the output of the said amplifier to the sweep circuit for limiting the initial amplitude of the sweep voltage to a value proportional to the output voltage of said amplifier, comparator means coupling the sweep circuit with the multivibrator for triggering the multivibrator when the sweep voltage exceeds a predetermined amplitude thereby switching the multivibrator to the second stable phase thereof, defined as the cutoff phase, said multivibrator being coupled to the electronic switch whereby the initiating phase and cutoff phase thereof alternately bias the electronic switch to pass respectively said one input signal and the output of said inverting means to the input of the averaging circuit.

8. An electronic multiplier for producing an output signal proportional to the product of two variable input signals comprising an amplifier receiving one of the input signals, the output signal of the amplifier being of opposite polarity from the input, a second amplifier in series with the first, the output of the second amplifier being the same polarity as the said input signal, averaging circuit means the output of which is proportional to the product of the two input signals, an electronic switch for alternately passing the output signal from each of said amplifiers to the averaging circuit means, and timing means connected to the switch for reversing the switch at intervals of time which are a function of the other of said variable input signals.

9. An electronic multiplier for producing an output voltage signal proportional to the product of two variable voltage input signals, the multiplier including squarewave generating means, means for limiting the absolute amplitude of the generated squarewave to a value proportional to the instantaneous value of one of said voltage input signals, pulsing means for triggering said squarewave generating means at substantially equal time intervals, sweep voltage generating means coupled to the squarewave generating means, said sweep voltage generating means being biased to initiate the generated sweep voltage simultaneously with the triggering of the squarewave generating means by said pulsing means, means connected to the sweep voltage generating means and responsive to the second of said voltage input signals for limiting the initial amplitude of the generated sweep voltage to a value proportional to the second of said input signals, comparator means coupling the output of the sweep voltage generating means with the squarewave generating means for triggering the squarewave generating means when the sweep voltage reaches a predetermined amplitude and simultaneously cutting off the sweep voltage generating means, and means for continuously averaging said squarewave to obtain said output voltage signal.

10. An electronic multiplier for producing an output voltage signal proportional to the product of two variable voltage input signals, the multiplier including squarewave generating means, means for limiting the absolute amplitude of the generated squarewave to a value proportional to the instantaneous value of one of said voltage input signals, pulsing means for triggering said squarewave generating means at predetermined time intervals and initiating one phase of the squarewave, time delay means for alternately triggering said squarewave generating means and reversing the phase of the squarewave, said time delay means including a sweep circuit and a blocking oscillator connected to and operated by the second of the voltage input signals for cutting off the sweep at substantially half the time interval of said pulsing means minus a time interval proportional to the instantaneous value of the second of said voltage input signals, and means for continuously averaging said squarewave to obtain said output voltage signal.

11. In an electronic multiplier for producing an output signal proportional to the product of two variable input signals, a bistable multivibrator, pulse generating means and time delay means coupled to the multivibrator for alternately triggering the multivibrator from one stable phase to the other, said time delay means producing a delayed pulse an interval of time after a generated pulse from said pulse generating means proportional to a constant minus the instantaneous value of one of said input signals, averaging circuit means, switching means connected to said multivibrator, means for reversing the polarity of the second of said input signals, said switching means alternately connecting the second of said input signals and its reciprocal from said reversing means to the averaging circuit means in response to the change in phase of the multivibrator.

12. In an electronic multiplier for producing an output signal proportional to the product of two variable input signals, means for reversing the polarity of one of the input signals, averaging circuit means, switching means for alternately passing said one input signal and the output of the reversing means to the averaging circuit means, and timing means operatively connected with the switching means for reversing said switching means at intervals of time which are a function of the other of the input signals.

References Cited in the file of this patent

UNITED STATES PATENTS

| | | |
|---|---|---|
| 2,401,447 | Wipff | June 4, 1946 |
| 2,433,237 | Rajchman | Dec. 23, 1947 |
| 2,426,454 | Johnson | Aug. 26, 1947 |
| 2,445,215 | Flory | July 13, 1948 |
| 2,461,895 | Hardy | Feb. 15, 1949 |
| 2,489,302 | Levy | Nov. 29, 1949 |
| 2,498,636 | Bassett | Feb. 28, 1950 |
| 2,542,631 | Crain | Feb. 20, 1951 |
| 2,543,442 | Dench | Feb. 27, 1951 |
| 2,557,086 | Fisk | June 19, 1951 |
| 2,559,499 | Gillette | July 3, 1951 |
| 2,566,085 | Green | Aug. 28, 1951 |
| 2,643,819 | Lee et al. | June 30, 1953 |
| 2,725,191 | Ham | Nov. 29, 1955 |